(12) United States Patent
Keller

(10) Patent No.: US 6,595,327 B2
(45) Date of Patent: Jul. 22, 2003

(54) LINEAR MOTION UNIT

(75) Inventor: Bernhard Keller, Wasserlosen-Kaisten (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 09/867,249

(22) Filed: May 29, 2001

(65) Prior Publication Data

US 2001/0046335 A1 Nov. 29, 2001

(30) Foreign Application Priority Data

May 26, 2000 (DE) .......................... 100 26 238

(51) Int. Cl.$^7$ ............................ F16C 17/00
(52) U.S. Cl. ........................ 184/5; 74/89.44; 384/13; 384/381
(58) Field of Search ................ 184/5, 21–23, 184/100; 74/89.44; 384/13, 14, 377, 378, 381–383

(56) References Cited

U.S. PATENT DOCUMENTS

| | | | |
|---|---|---|---|
| 3,678,776 A | * 7/1972 | Patterson | 74/89.4 |
| 4,811,618 A | * 3/1989 | Takayama | 74/89.44 |
| 5,454,278 A | 10/1995 | Kasuga | 74/459 |
| 5,749,266 A | 5/1998 | Tsukada | 74/459 |
| 5,809,838 A | * 9/1998 | Miyaguchi et al. | 74/89.44 |
| 6,123,457 A | * 9/2000 | Suzuki et al. | 384/13 |
| 6,125,968 A | 10/2000 | Shirai | 184/5 |
| 6,135,638 A | * 10/2000 | Agari | 384/13 |
| 6,216,821 B1 | 4/2001 | Namimatsu et al. | 184/99 |
| 6,220,110 B1 | 4/2001 | Yang et al. | 74/459 |
| 6,257,766 B1 | * 7/2001 | Agari | 384/45 |
| 6,364,058 B1 | * 4/2002 | Nishide et al. | 184/5 |
| 6,401,867 B1 | * 6/2002 | Michioka et al. | 184/5 |

FOREIGN PATENT DOCUMENTS

| | | |
|---|---|---|
| DE | 4340078 | 7/1994 |
| DE | 19754454 | 6/1998 |
| DE | 19833228 | 2/1999 |
| DE | 29919250 | 2/2000 |
| EP | 0874172 | 10/1998 |
| EP | 1031767 | 8/2000 |

\* cited by examiner

Primary Examiner—Chong H. Kim

(57) ABSTRACT

A linear motion unit (10) includes a runner that is arranged so as to be movable back and forth on a rod along the rod's axis (S), and at least one lubricating device (28) surrounding the rod at least partially. The lubricating device (28) includes at least one lubricating element (32) that stands in lubricating contact with the rod, and at least one lubricant reservoir (34) that is carried by the runner. In accordance with the invention, the lubricant reservoir (34) is arranged radially outside the lubricating element (32) with respect to the axis (S) of the rod.

26 Claims, 8 Drawing Sheets

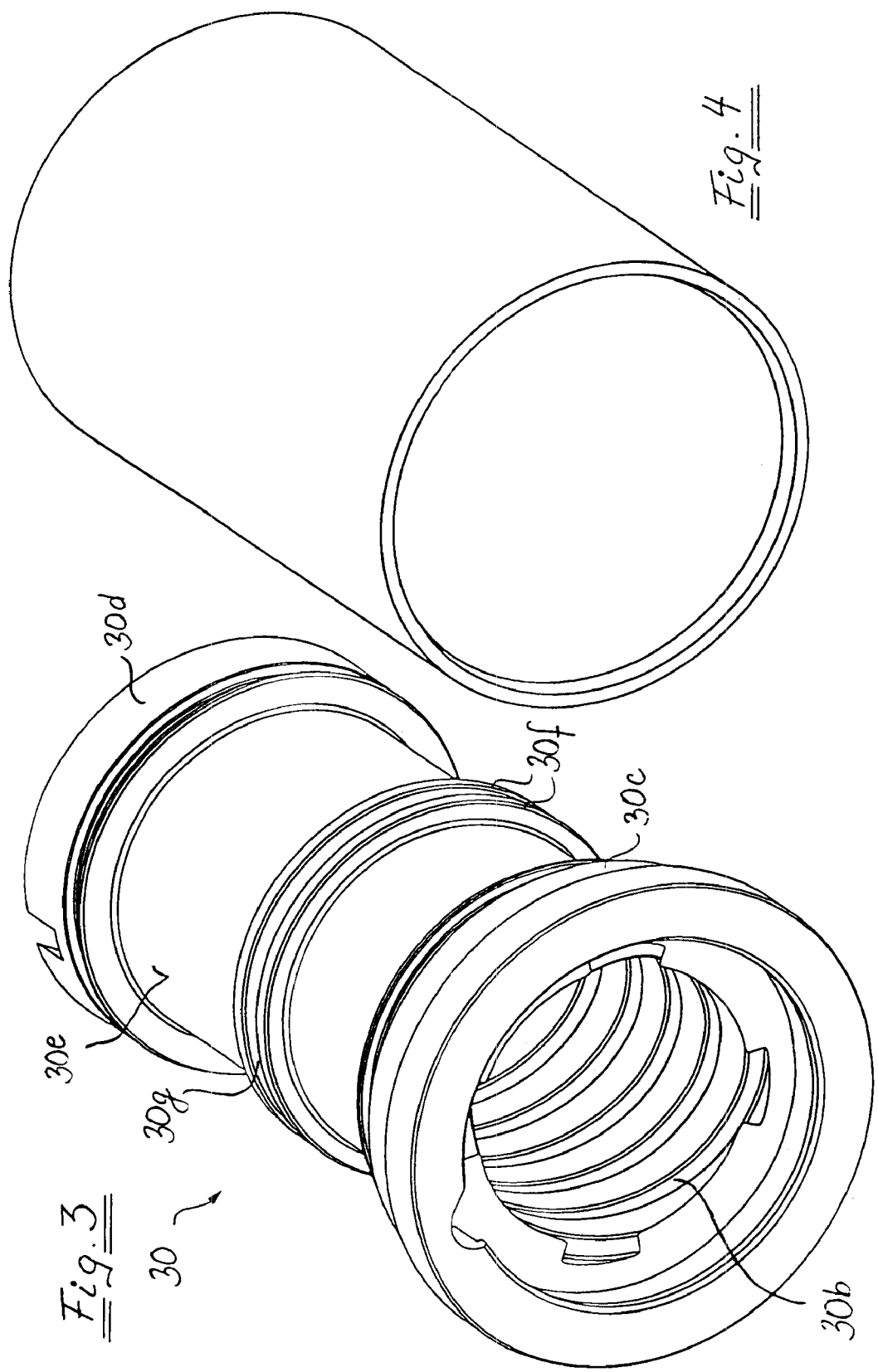

LINEAR MOTION UNIT

BACKGROUND OF INVENTION

1. Field of the Invention

The invention relates to a linear motion unit having a runner that is arranged so as to be movable back and forth on a rod along the rod's axis, and also having at least one lubricating device which at least partially surrounds the rod and which includes at least one lubricating element that stands in lubricating contact with the rod and at least one lubricant reservoir that is immovably joined to the runner.

2. The Prior Art

Such a linear motion unit is known, for example from EP 0,874,172 A1. In this linear motion unit embodied as a roller spindle drive, two lubricating devices are arranged on the axial ends of the runner assembly and axially contiguous thereto. Each lubricating device is composed of a lubricating element of a polymer foam that contains lubricant and that is in lubricating engagement with the threaded spindle. In addition, each lubricating device has a lubricant reservoir that is axially adjacent to the lubricating element and is connected to the lubricating element by a passage, so that more lubricant can be supplied to the lubricating element from the lubricant reservoir in the event of excessive consumption of lubricant.

A major disadvantage of this known linear motion unit is the small active lubricating length of its lubricating elements, which results in a high contact pressure of the lubricating elements and correspondingly severe wear of the polymer foam material. In addition, all dirt wiped from the surface of the rod is deposited in the pores of the polymer foam material, a clogging it. This can impede the dispensing of lubricant and can also lead to hardening of the polymer foam material, both of which impair adequate lubricating contact of the lubricating elements with the surface of the rod.

In addition, linear motion units are known from DE 198 33 228 A1 and U.S. Pat. No. 5,749,266, which disclose lubricating devices comprised of lubricating elements made of polymer foam that contains lubricant. Furthermore, DE 197 54 454 A1 discloses a linear motion unit in which the lubricating device has an external lubricant reservoir. For the sake of completeness, reference is also made to DE 299 19 250 U1 regarding the state of the art.

SUMMARY OF THE INVENTION

In contrast to the prior art devices, the object of the invention is to provide a linear motion unit of the aforementioned type which permits the use of lubricating elements with large active lubricating length while preserving compact construction of the overall linear motion unit.

This object is attained in accordance with the invention through a linear motion unit of the class in which the lubricant reservoir is arranged radially outside the lubricating element with respect to the axis of the rod. In comparison with the known lubricating device from the class-defining EP 0,874,172 A1, the lubricating element can thus have a significantly greater extension in the direction of the rod axis with the same axial length of the lubricating device and the same supply volume of the lubricant reservoir, so that the aforementioned disadvantages thereof can be avoided in a simple manner in accordance with the invention. Consequently, in the most favorable case, the entire axial extent of the lubricating device can be used to lubricate the surface of the rod. The lubricating element should advantageously have an active lubricating length of at least 15 mm, preferably at least 25 mm.

The radially concentric arrangement of lubricating element and lubricant reservoir can be provided in a simple manner in the case of a lubricating device having only a lubricating function in that the lubricating device has a base body on whose inner circumferential surface is arranged at least one lubricating element, and whose outer circumferential surface forms, at least in part, an inner boundary wall of the lubricant reservoir. In accordance with the invention, the lubricating device need not fully enclose the rod. Rather, it can still perform its function if it merely extends around the rod in a U-shaped or horseshoe manner. With regard to sealing of the lubricating device toward the outside, it is preferred for purposes of simplifying the constructive design for the base body to be designed in a sleeve shape.

To provide the outer boundary wall of the lubricant reservoir, it is possible in accordance with another embodiment of the invention to provide a preferably sleeve-shaped cover body whose inner circumferential surface encloses the outer circumferential surface of the base body at a distance over at least part of its length. Alternatively, it is also possible for the outer boundary wall of the lubricant reservoir to be formed by the inner circumferential surface of a recess in the runner or a part connected thereto. In the latter case, the receiving volume of the lubricant reservoir can be increased by sectional enlargement of this recess.

Simple and cost-effective manufacture results when the base body and, if applicable, the cover body are manufactured as injection-molded parts, preferably of plastic.

To facilitate the resupply of lubricant from the lubricant reservoir to the lubricating element, it is proposed that at least one radial connecting opening may be provided in the base body through which the lubricant contained in the lubricant reservoir can reach the at least one lubricating element. As is described below in greater detail, the throughput of lubricant can be influenced by the size and shape of the connecting opening and/or by elements arranged in this opening.

A variety of embodiments are also conceivable with respect to the interior design of the base body of the lubricating device.

In one embodiment, the inner circumferential surface of the base body can have at least one helical groove in which a correspondingly helical lubricating element is accommodated. If the linear motion unit is a roller spindle drive and if the threaded spindle of the roller spindle drive has a plurality of spindle grooves, i.e. if the threaded spindle is multiple-threaded, then it is advantageous for the lubricating device to also have a number of helical lubricating elements that corresponds to the number of threads and each of which lubricates one of the spindle grooves. If the intention is to lubricate not just the spindle grooves of the threaded spindle, but also the rest of the outer circumferential surface of the threaded spindle, then additional lubricating elements can be provided on the inner circumferential surface of the base body for this purpose. It is advantageous for each of the thread grooves to be in lubricant exchange contact with the lubricant reservoir via its own connecting opening.

In another embodiment, at least one axially-extending groove in which a lubricating strip is accommodated can be formed in the inner circumferential surface of the base body. Such a lubricating strip can, of course, touch only the outer circumferential surface of the rod and thus wet it with lubricant. However, if the spindle grooves of a rod embodied as a threaded spindle are also to be supplied with lubricant, then the lubricating strip can further possess a plurality of projections, each of which engages a corresponding spindle groove. If lubrication of the remaining outer circumferential surface of the threaded spindle is to be avoided, this can be accomplished by appropriately long wetting of the projections which engage the spindle grooves. By this means, the connecting sections of the lubricating strip located between two adjacent projections can be spaced apart from the outer circumferential surface of the threaded spindle.

It is advantageous for the lubricating element to extend over essentially the entire length of the groove. However, if sufficient axial space is available, a wiping element can be arranged in the groove ahead of and/or behind the lubricating element viewed in the direction of the groove's extension, such wiping element's purpose being primarily to wipe from the surface of the rod dirt particles that enter the lubricating region and to keep them away from the actual lubricating element. In addition, the wiping element also serves to wipe excess lubricant from the rod surface and thus to contribute to uniform lubrication of the linear motion unit.

The axial groove embodiment discussed above has the advantage of simpler manufacture, while the helical groove embodiment has the advantage that the helical lubricating element is in lubricating contact with the spindle groove over a greater path length, which both increases lubricating efficiency and reduces loading on the lubricating element.

To be able to facilitate the transport of lubricant from the lubricant reservoir to the lubricating element, it is proposed that at least one groove, preferably running in the circumferential direction, be formed in the outer circumferential surface of the base body, in which groove a lubricant intake element is accommodated. Lubricant exchange between this intake element and the lubricating element can be ensured in a variety of ways. For example, the lubricant intake element can have at least one radially internal projection that engages a corresponding connecting opening and is in lubricant exchange contact with a corresponding lubricating element, i.e. in particular touches the corresponding lubricating element. It is also possible to place a specially manufactured wick element, which assumes the function of this projection, in the connecting opening.

Polymer foam, in particular open-cell polymer foam, has proven its utility as a material for the at least one lubricating element and/or the at least one lubricant intake element and/or the at least one wick element. Preferably, the at least one lubricating element and/or the at least one lubricant intake element and/or the at least one wick element can be cut from a polymer foam sheet material, for example by water jet cutting. This also applies for helical lubricating elements which are cut in the shape of a spiral, for example, where the value of the radius of the innermost turn of this spiral corresponds to at least the value of the desired helix radius of the helical lubricating element. The spiral thus obtained can then be pulled or formed into a helix, taking advantage of the flexibility of the foam plastic or polymer foam material, and can be placed in the helical groove in the inner surface of the base body of the lubricating device.

It is also conceivable that the at least one wick element is embodied as a membrane, preferably as a one-way membrane opening from the lubricant reservoir toward the lubricating element.

In a refinement of the invention, it is possible to provide on at least one, and preferably both, of the axial longitudinal ends of the lubricating device a sealing device that prevents the undesirable escape of lubricant from the lubricating device. Preferably, this sealing device is identical in construction to the seals that are provided at the axially longitudinal ends of the threaded nut unit.

Because of the design of the lubricating device with a lubricant reservoir, the linear motion unit explained above is provided with adequate lubrication for a long period of time, if not its entire lifetime. To be able to ensure adequate lubrication over the entire lifetime of the linear motion unit even under high loading, and thus high lubricant consumption, provision can be made for the lubricant reservoir to have a connection for lubricant filling. The lubricant can be lubricating grease or, preferably, lubricating oil.

It must also be mentioned that the runner, which is known per se, or a mounting unit fastened thereto can be used to attach a functional unit that is to be moved by the linear motion unit. Moreover, it has proven advantageous for the lubricating device to be arranged essentially completely within the axial extent of the runner and/or the mounting unit.

Particularly when the linear motion unit is designed as a roller spindle drive, the load exerted on the mounting unit need not be transmitted through the threaded nut unit to the threaded spindle at all or at least only to a negligible extent. Rather, this load can be transmitted to an extruded rail which is supported in a load-bearing manner on a guide housing. Since the threaded nut unit thus need only perform the function of transforming a rotary motion of the threaded spindle into a linear motion of the runner, it can be relatively short in the axial direction, in particular significantly shorter than the mounting unit whose length is determined solely by the requirement to provide a large variety of mounting options for the functional units that can be moved by the linear motion unit. Thus, space for accommodating the lubricating devices can easily be created in the runner and/or the mounting unit, or existing and previously unused space can be used to accommodate the lubricating devices. It can easily be seen that the runner and the mounting unit would thus have a shorter overall length in the axial direction and that this shorter overall length can be used directly to increase the travel distance of the roller spindle drive without further changes to the roller spindle drive.

According to the invention, the entire axial extent of the lubricating device need not be accommodated within the axial extent of the runner and/or the mounting unit. Rather, when the basic idea of the present invention is utilized, a considerable reduction in the length of the runner can be achieved when at least 70%, and preferably at least 90%, of the axial extent of the lubricating device is arranged within the axial extent of the runner and/or of the mounting unit.

As a further feature of the invention, the concept of arranging the lubricating device essentially within the axial extent of the runner and/or the mounting unit can also be used independently of the radially contiguous arrangement of lubricating element and lubricant reservoir. Consequently, independent protection is being sought for this concept.

The invention explained above can be used to advantage in such applications as a roller spindle drive, especially a ball screw, which comprises a threaded spindle-forming the rod-with a spindle axis, wherein at least one spindle groove is provided in the outer circumferential surface of the threaded spindle, and also comprises a threaded nut unit which forms at least part of the runner and surrounds the threaded spindle, with at least one spindle return groove which, together with the associated spindle groove of the threaded spindle, forms a thread channel, wherein the thread channel is part of a closed circulating channel which accommodates a continuous series of rollers.

To ensure a relative position of the lubricating device and threaded spindle which guarantees the desired thread engagement of the spindle groove(s) and lubricating groove (s), at least one alignment pin may be placed in the base body, preferably screwed into it, that engages a spindle groove of the threaded spindle. In principle, the engagement of this alignment pin with the spindle groove is only necessary during assembly of the roller spindle drive, since later in operation the correct alignment is maintained by the attachment of the individual assemblies to one another. So as not to unnecessarily hinder operation of the roller spindle drive, the alignment pin can thus be removed again, or at least withdrawn somewhat, after assembly is completed. It is also possible to manufacture at least the head portion of the alignment pin which engages the spindle groove of a material that wears quickly in operation, for example a soft plastic.

BRIEF DESCRIPTION OF THE DRAWINGS

For a better understanding of the invention, reference may be made to the following description of exemplary embodiments thereof, taken in conjunction with the accompanying drawings, in which:

FIG. 3 is a perspective view of a base body of the lubricating device of FIG. 2;

FIG. 4 is a perspective view of a cover sleeve of the lubricating device of FIG. 2;

DESCRIPTION OF EXEMPLARY EMBODIMENTS

Figure 1:
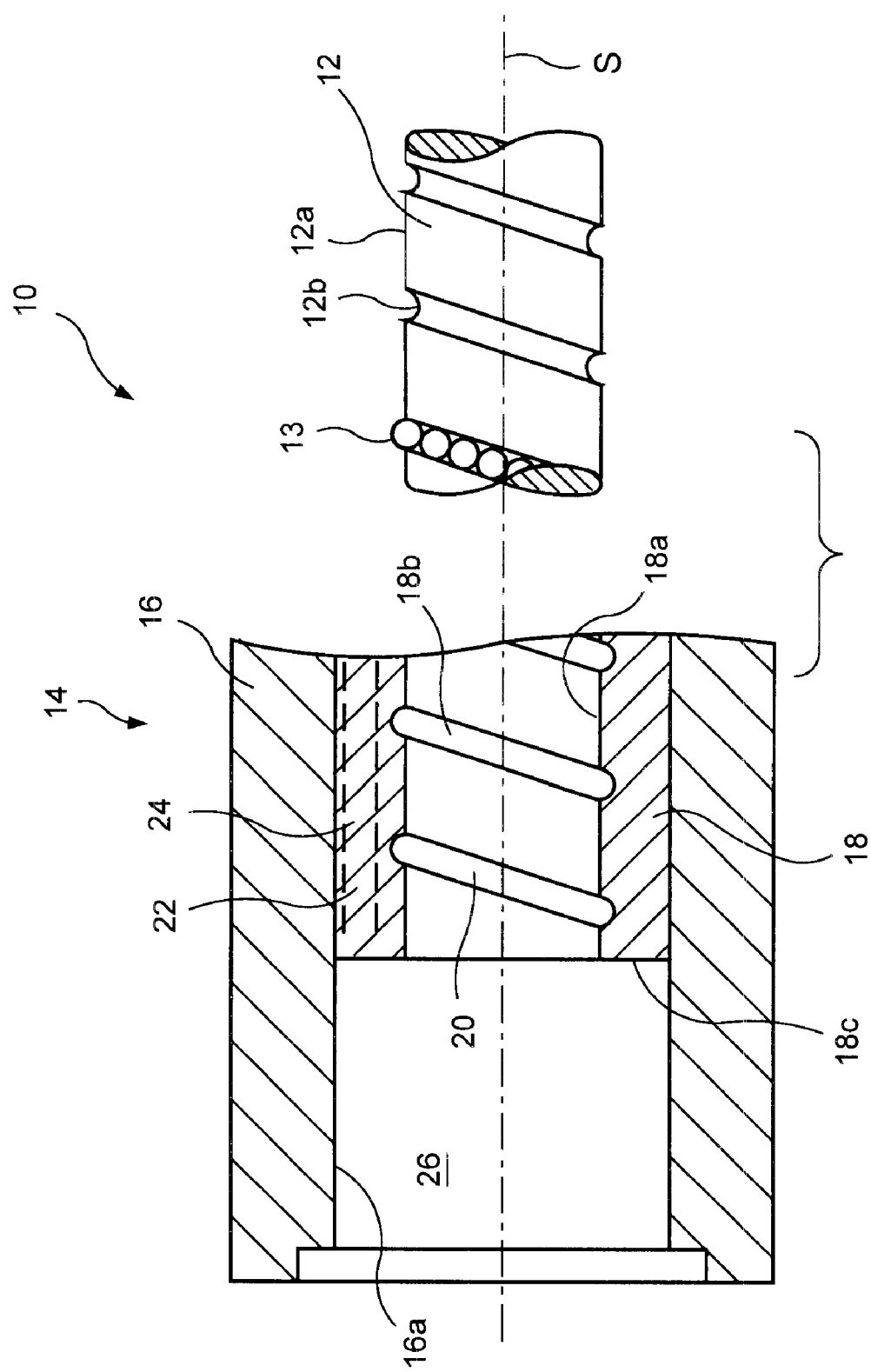
FIG. 1 is a partial schematic cross-sectional view of an embodiment of a roller spindle drive according to the invention.

FIG. 1 shows a roller spindle drive as an example of a linear motion unit according to the invention, labeled overall as 10. It comprises a threaded spindle 12, with a spindle axis S, and a guide carriage 14 which travels back and forth along the threaded spindle 12 in the same direction as the spindle axis S and which serves to attach a functional unit (not shown) that is moved by the roller spindle drive 10. The guide carriage 14 comprises a guide carriage main section 16 and a threaded nut unit 18 that is separate from the guide carriage main section 16 and is placed in an axial passage 16a of the guide carriage main section 16 such that it cannot rotate relative thereto.

One or more spindle grooves 12b are formed in the outer circumferential surface 12a of the threaded spindle 12. The number of spindle grooves 12b that are helically coaxial to one another determines whether the threaded spindle 12 is a single-threaded or multiple-threaded spindle. Formed in the inner circumferential surface 18a of the threaded nut unit 18 is a corresponding number of threaded spindle grooves 18b, which grooves, together with the spindle grooves 12b of the threaded spindle 12, form a thread channel 20. Said channel, like the return channel 22 shown in dashed lines in FIG. 1, is part of a continuous circulating channel 24, in which are arranged a plurality of rollers, preferably balls 13.

In a manner known per se, the guide carriage 14 is carried on an extruded rail (not shown), which is supported in a load-transmitting manner by a guide housing so that the nut unit 18 is not rotatable relative to the spindle axis S and need transmit no load, or almost no load, to the threaded spindle 12. The threaded spindle 12 is rotatably supported by end pieces (likewise not shown) of the guide housing such that it rotates about the spindle axis S. In this way, a rotation of the threaded spindle 12 about the spindle axis S can be transformed into a linear motion of the guide carriage 14 in the direction of the spindle axis S.

As can likewise be seen in FIG. 1, in the roller spindle drive 10 according to the invention, additional space 26 is still available in the vicinity of the left axial end of the guide carriage main section 16 adjacent the end face 18c of the threaded nut unit 18. This space is used in accordance with the invention to accommodate a lubricating device 28 (see FIG. 2), a first embodiment of which is described below with reference to FIGS. 2–7.

Figure 2:
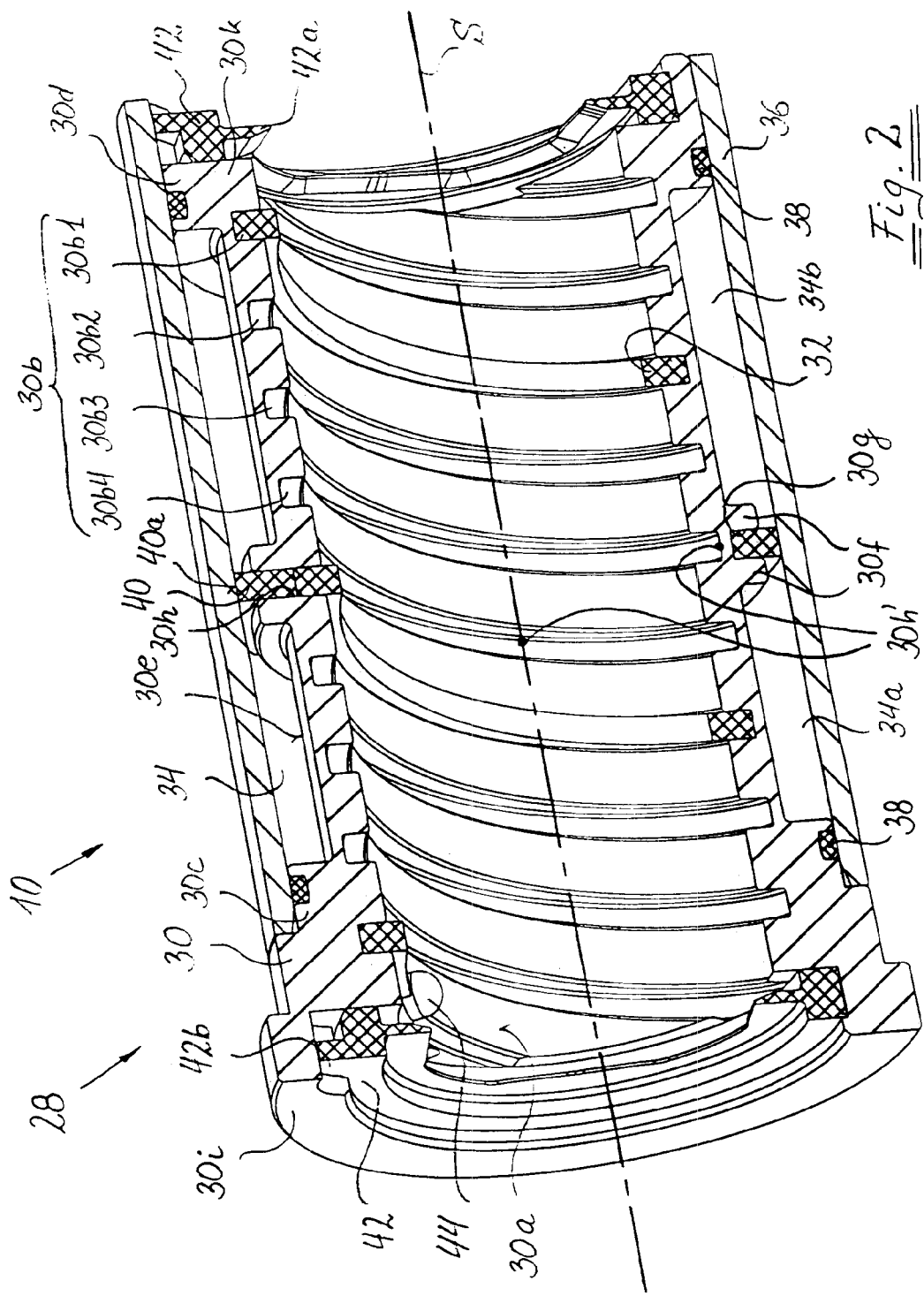
FIG. 2 is a partially cross-sectional, perspective view of a first embodiment of a lubricating device according to the invention.
Figure 6:
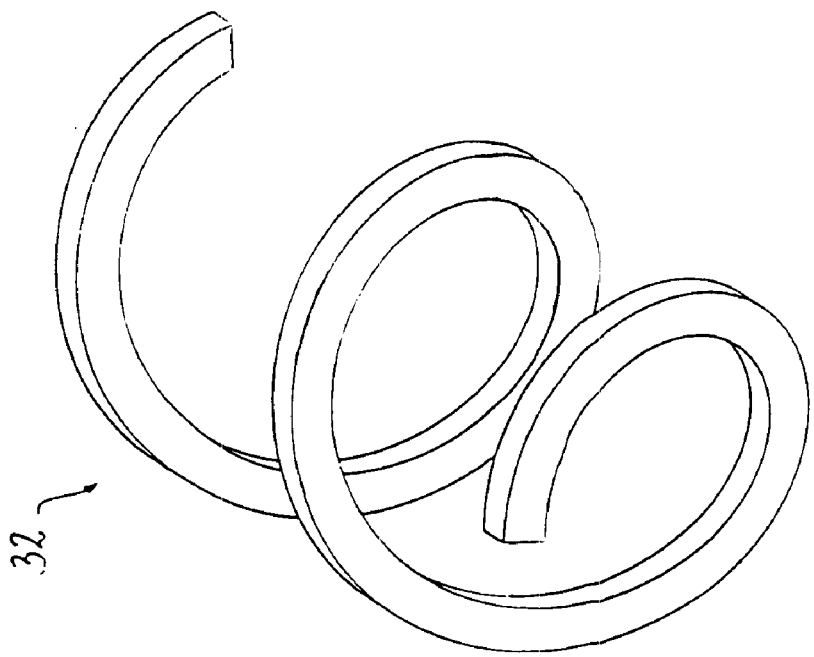
FIG. 6 is a perspective view of one embodiment of a lubricating element of the lubricating device of FIG. 2.

The lubricating device 28 of FIGS. 2–7 comprises a base body 30 (see also FIG. 3), whose inner circumferential surface 30a is formed with a total of four coaxial helical grooves 30b1, 30b2, 30b3 and 30b4 (hereinafter referred to jointly as helical grooves 30b). Arranged in the helical grooves 30b are helical lubricating elements 32 (see also FIG. 6); for the sake of clarity, only the lubricating element 32 located in the helical groove 30b1 is illustrated in FIG. 2. Each of the lubricating elements 32 serves to engage in a thread groove 12b of the threaded spindle 12. The lubricating device 28 shown in FIG. 2 is thus designed to act in cooperation with a four-lead threaded spindle 12.

A lubricant reservoir 34 is formed on the outside of the base body 30. For this purpose, the base body 30 includes, in the vicinity of its two longitudinal ends, ring projections 30c and 30d which extend radially over the essentially cylindrical outer circumferential surface 30e of the base body 30. A cover sleeve 36 (see also FIG. 4) is slipped over the ring projections 30c and 30d, producing, in conjunction with seal rings 38, a closed cavity for the lubricant reservoir 34. Not shown in the figures is a connection for a lubricating nipple for filling the lubricant reservoir 34 with lubricant, preferably lubricating oil.

Figure 5:
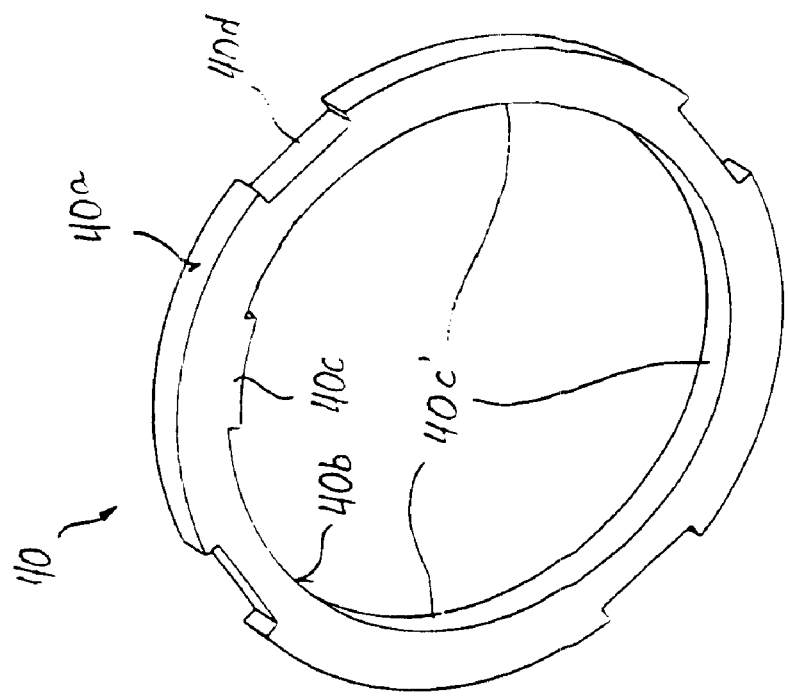
FIG. 5 is a perspective view of a lubricant intake element of the lubricating device of FIG. 2.
Figure 7:
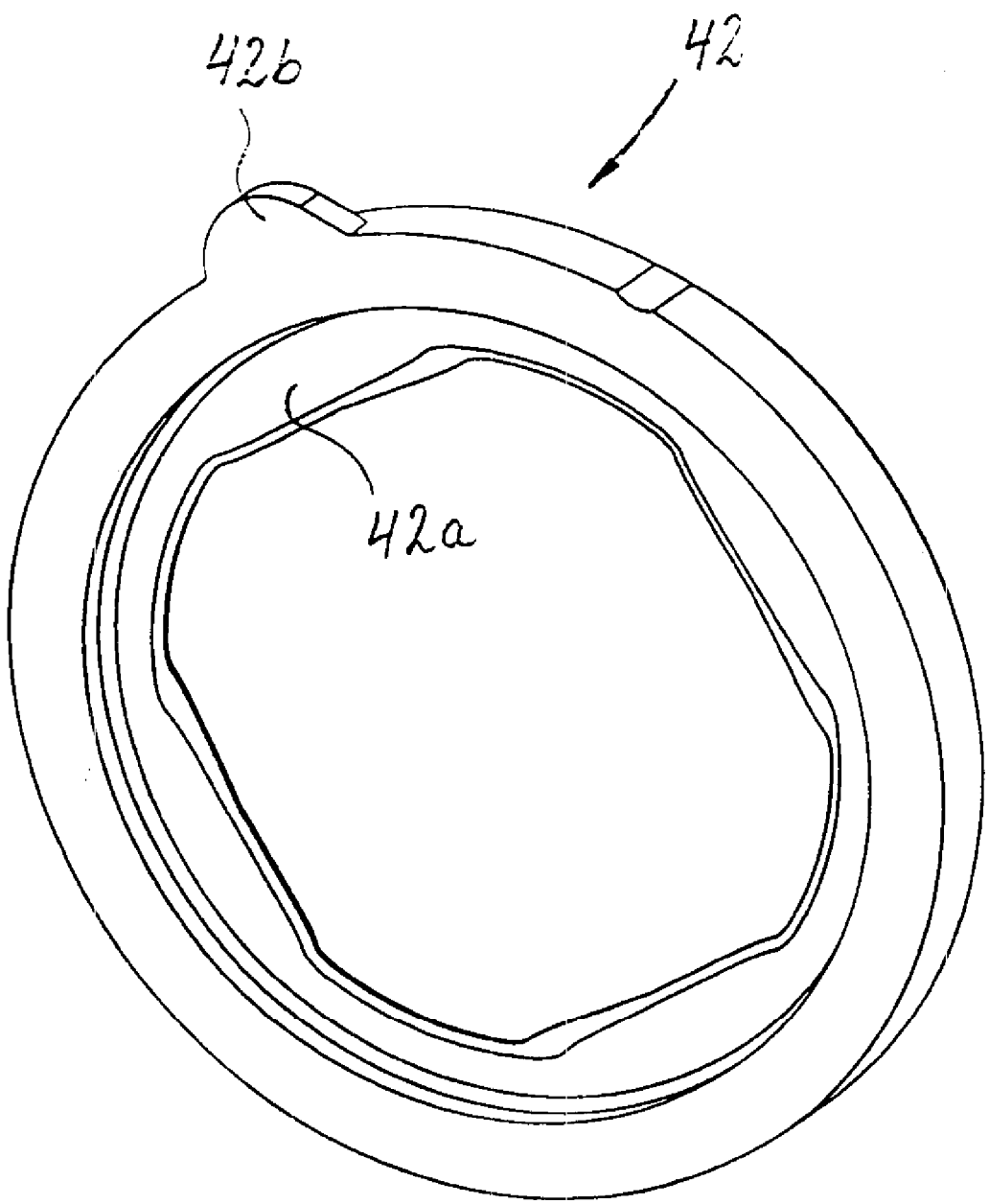
FIG. 7 is a perspective view of a sealing element of the lubricating device of FIG. 2.

The base body 30 has, in the approximate area of its longitudinal center, two annular ribs 30f, which extend radially over the outer circumferential surface 30e of the base body 30, but not as far as the ring projections 30c and 30d. Accommodated in the annular groove 30g delimited by these two annular ribs 30f is a ring-shaped lubricant intake element 40 (see also FIG. 5), whose outer circumferential surface 40a contacts the inner surface of the cover sleeve 36. Provided on the inner circumferential surface 40b of the lubricant intake element 40 as shown in FIG. 5 is a wick projection 40c, which extends through a radial opening 30h (see FIG. 2) in the base body 30 and touches the outer circumferential surface of the helical lubricating element 32. In this way, additional lubricant can be supplied to the lubricating element 32 from the lubricant reservoir 34.

Moreover, as shown in FIG. 5, recesses 40d are provided in the outer circumferential surface 40a of the lubricant intake element 40, which recesses permit an exchange of lubricant between the two chambers 34a and 34b of the lubricant reservoir 34.

It is important to remember that only one of the helical lubricating elements 32—specifically, the lubricating element shown in FIG. 2—is supplied with lubricant from the lubricant reservoir 34 in the embodiment of the lubricating device 28 described above. If the other lubricating elements (not shown) are also to be supplied directly with lubricant from the lubricant reservoir 34, additional openings analogous to the opening 30h would also have to be provided at other locations on the circumference of the annular groove 30g, such as at the locations labeled 30h' in FIG. 2, and the lubricant intake element 40 (see FIG. 5) would have to have projections corresponding to the wick projection 40c at the locations labeled 40c'.

To be able to prevent leakage of lubricant from the area of the lubricating device 28, sealing devices 42 (see also FIG. 7) with internal sealing lips 42a are provided in the vicinity of the longitudinal ends 30i and 30k of the base body 30. As can be seen especially well in FIG. 7, the sealing devices 42 are again designed with the four-lead nature of the threaded spindle 12 in mind. An external lobe 42b ensures that the desired relative rotational position between the sealing device 32 and the threaded spindle 12 is maintained.

As shown in FIG. 2, a retention pin 44 is additionally screwed into the base body 30 in the vicinity of the base body's longitudinal end 30i. The radially inner end of the pin 44 is intended to engage in a spindle groove 12b of the threaded spindle 12, and thus to ensure the desired position of the base body 30, and hence of the entire lubricating device 28, relative to the threaded spindle 12.

Figure 8:
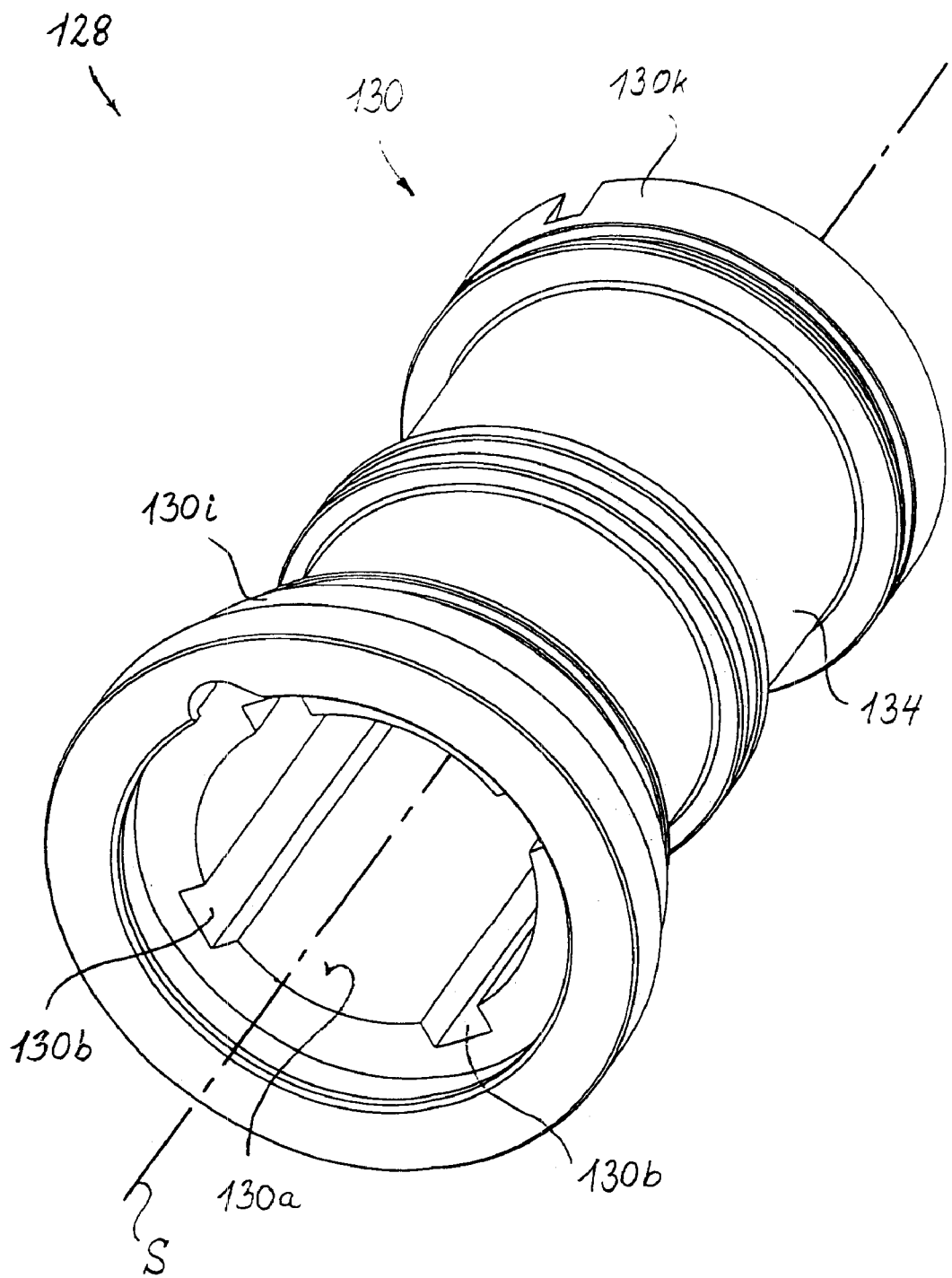
FIG. 8 is a view similar to FIG. 3 of a base body of an alternative embodiment of a lubricating device.
Figure 9:
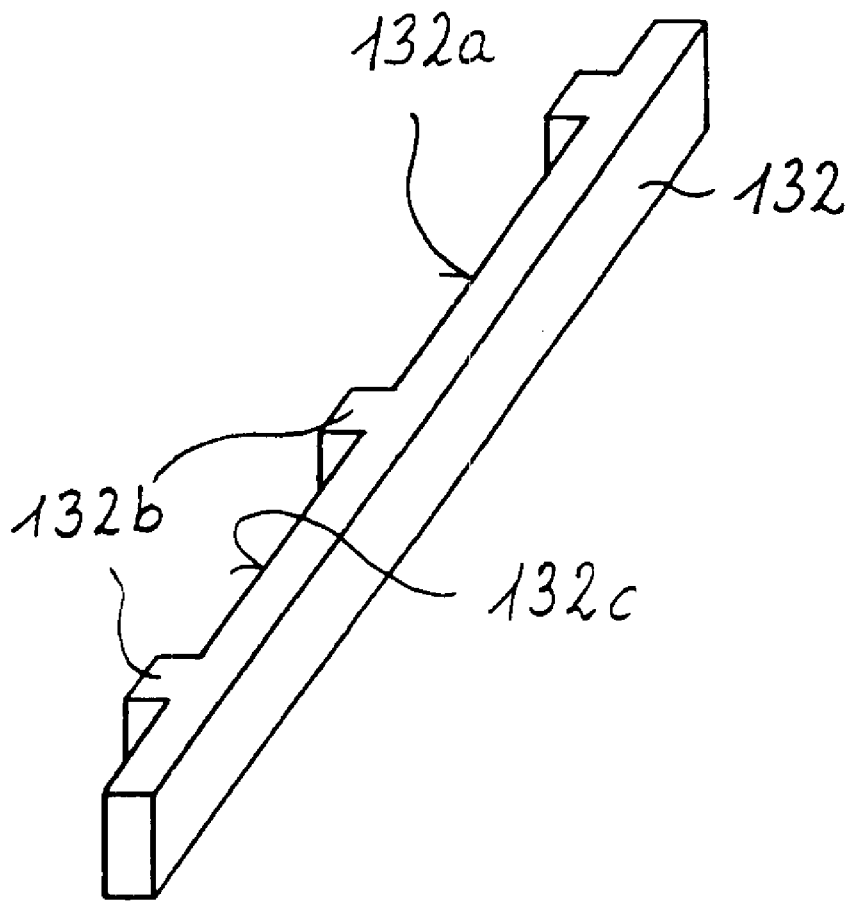
FIG. 9 is a perspective view of a lubricating element of the lubricating device of FIG. 8.

Illustrated in FIGS. 8 and 9 are parts of an alternative embodiment of a lubricating device according to the invention that corresponds essentially to the embodiment in FIG. 2. Hence, analogous parts are labeled in FIGS. 8 and 9 with the same reference numbers as in FIGS. 2 through 7, but increased by 100. Moreover, the embodiment of FIGS. 8 and 9 is only described below to the extent that it differs from the embodiment in FIGS. 2 through 7, which description is otherwise expressly referenced here.

The base body 130 of the lubricating device 128 differs from the base body 30 of the lubricating device 28 in FIG. 2 mainly in that the grooves 130b provided on the inner circumferential surface 130a for accommodating lubricating elements 132 (see FIG. 9) extend substantially in the lengthwise direction of the spindle axis S. Accordingly, the lubricating elements 132, as shown in FIG. 9, are designed as lubricating strips, and lubricating projections 132b are provided on a longitudinal side 132a of such lubricating strips 132 and are intended to engage in the spindle grooves 12b of the threaded spindle 12. When the lubricating projections 132b are dimensioned appropriately, the surface sections 132c provided between the lubricating projections 132b of the longitudinal side 132a of the lubricating strip 132 can contact the outer circumferential surface 12a of the threaded spindle 12 and apply lubricant thereto.

Another difference of the lubricating device 128 shown in FIGS. 8 and 9 as compared to the lubricating device 28 shown in FIGS. 2 through 7 is that the base body 130, in particular its two longitudinal ends 130i and 130k, are dimensioned such that the lubricant reservoir 134 is not delimited in cooperation with a cover sleeve corresponding to the cover sleeve 36, but rather is delimited in cooperation with the inner circumferential wall 16a of the guide carriage main section 16. As a result, the receiving volume of the lubricant reservoir 134 can be increased as compared to the lubricant reservoir 34 of the embodiment shown in FIGS. 2 through 7, namely by the volume occupied by the cover sleeve. A further enlargement of the receiving volume of the lubricant reservoir can be achieved through appropriate processing of the guide carriage main section 16.

With regard to the flow of lubricant from the lubricant reservoir 134 onto the lubricating strips 132, see the above remarks regarding the lubricating device 28 shown in FIGS. 2 through 7.

Figure 10:
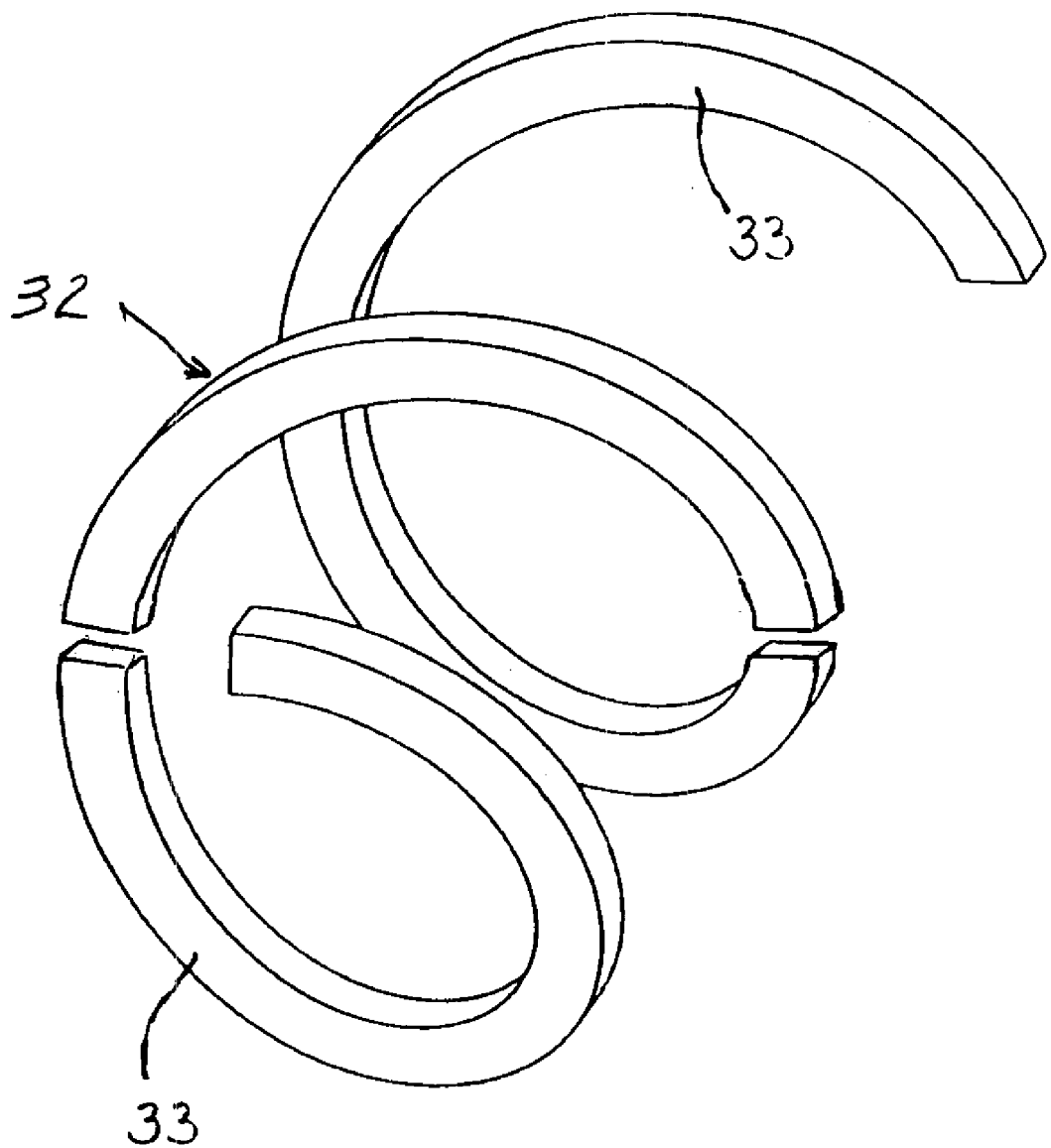
FIG. 10 is a perspective view of another embodiment of a lubricating element in accordance with the invention.

It is additionally noted that the lubricating element 32 need not extend over the entire length of the receiving groove 30b. Rather, as shown in FIG. 10, if the groove 30b is sufficiently long, wiping elements 33 can be provided in its longitudinal direction in front of and/or behind the lubricating element. The purpose of these wiping elements 33 is to protect the lubricating element 32 from particles of dirt which could penetrate the region of the lubricating device 28 in undesirable fashion. They also have the task of removing excess lubricant from the threaded spindle 12 to ensure uniform lubrication of the spindle. This also applies to the axial groove embodiment shown in FIGS. 8 and 9.

With regard to the wick projection 40c (see FIG. 5), it is noted that this item can also be manufactured as a separate part from the intake element 40 and inserted in the connecting opening 30h. Moreover, instead of the wick projection 40c, it is possible to arrange in the passage 30h a membrane unit which allows lubricant to pass in only one direction, namely from the reservoir 34 to the lubricating element 32, and hence functions as a sort of check valve. This variant, too, can be used in the axial groove embodiment of FIGS. 8 and 9 as well.

Although the invention has been described herein by reference to specific embodiments thereof, it will be understood that such embodiments are susceptible of modification and variation without departing from the inventive concepts disclosed. All such modifications and variations, therefore, are intended to be included within the spirit and scope of the appended claims.

What is claimed is:

1. A linear motion unit, comprising:
    a rod having an axis S and at least one helical groove in the outer circumferential surface thereof;
    a runner that is arranged to be movable back and forth on the rod along the axis S, said runner having at least one internal helical groove on the inner surface thereof which forms, together with said at least one groove on the rod, a helical channel;
    at least one lubricating device comprising a base body having an inner circumferential surface, which at least partially surrounds the rod, and an outer circumferential surface, said inner circumferential surface having at least one helical groove formed therein and accommodating at least one correspondingly helical lubricating element in lubricating contact with the rod;
    at least one lubricant reservoir carried by the runner, the lubricant reservoir being arranged radially outside of the lubricating element with respect to the axis S of the rod, said outer circumferential surface of said base body forming, at least in part, an inner boundary wall of the lubricant reservoir; and
    a plurality of rollers in said at least one helical channel, said roller supporting said rod and said runner with re to one another.

2. The linear motion unit in accordance with claim 1, wherein the at least lubricating element as an active lubricating length of at least 15 mm.

3. The linear motion unit in accordance with claim 1, wherein the outer boundary wall of the lubricant reservoir is formed by the inner circumferential surface of a cover body which surrounds, at a distance, the outer circumferential surface of at least part of the length of the base body.

4. The linear motion unit in accordance with claim 3, wherein the cover body is sleeve-shaped.

5. The linear motion unit in accordance with claim 1, wherein the outer boundary wall of the lubricant reservoir is formed by the inner circumferential surface of a recess in the runner or a component connected to the runner, which surrounds, at a distance, the outer circumferential surface of at least part of the length of the base body.

6. The linear motion unit in accordance with claims 3, wherein at least one of the base body and the cover body is manufactured as an injection-molded part.

7. The linear motion unit in accordance with claim 6, wherein the injection-molded part is composed of plastic.

8. The linear motion unit in accordance with claim 1, wherein the lubricating element extends substantially along the entire length of the groove.

9. The linear motion unit in accordance with claim 1, wherein a wiping element is arranged in the groove ahead of and/or behind the lubricating element viewed in the direction of the groove's extension.

10. The linear motion unit in accordance with claim 1, wherein at least one radial connecting opening is provided in the base body through which the lubricant contained in the lubricant reservoir reaches the at least one lubricating element.

11. The linear motion unit in accordance with claim 10, wherein a wick element is arranged in the at least one radial connecting opening, the wick element being in lubricant exchange contact with an associated lubricating element.

12. The linear motion unit in accordance with claim 11, wherein at least one groove is formed in the outer circumferential surface of the base body, in which groove a lubricant intake element is accommodated.

13. The linear motion unit of claim 12, wherein the at least one groove extends in the circumferential direction.

14. The linear motion unit in accordance with claim 12, wherein the wick element comprises a radially internal projection of the lubricant intake element.

15. The linear motion unit in accordance with claim 12, wherein at least one of the at least one lubricating element, the at least one lubricant intake element, and the wick element is made of a polymer foam.

16. The linear motion unit in accordance with claim 15, wherein the polymer foam is cut from a polymer foam sheet material.

17. The linear motion unit in accordance with claim 1, wherein the lubricating device includes longitudinal ends spaced apart in the direction of the axis S, and a sealing device is provided at one or both of the axial longitudinal ends of the lubricating device.

18. The linear motion unit in accordance with claim 1, wherein the lubricant reservoir has a connection for lubricant filling.

19. The linear motion unit in accordance with claim 1, wherein the lubricant is lubricating grease or lubricating oil.

20. The linear motion unit in accordance with claim 1, wherein the runner, or a mounting unit fastened thereto, can be used to attach a functional unit that is to be moved by the linear motion unit.

21. The linear motion unit in accordance with claim 17, wherein the lubricating device is arranged substantially within the axial extent of the runner and/or the mounting unit.

22. The linear motion unit in accordance with claim 21, wherein at least 70% of the axial extent of the lubricating device is arranged within the axial extent of the runner and/or the mounting unit.

23. The linear motion unit in accordance with claim 19, wherein at least 90% of the axial extent of the lubricating device is arranged within the axial extent of the runner and/or the mounting unit.

24. The linear motion unit in accordance with claim 1, wherein the unit comprises a ball screw drive, comprising:
   a threaded spindle, forming the rod, with the spindle axis S, and wherein said at least one helical groove provided in the outer circumferential surface of the rod comprises a spindle groove; and
   a threaded nut unit which forms at least part of the runner and surrounds the threaded spindle, said at least one internal helical groove being formed on the nut unit and comprises at least one spindle return groove which, together with the associated spindle groove of the threaded spindle, forms a thread channel, the thread channel being part of a closed circulating channel which accommodates a continuous series of said rollers.

25. The linear motion unit in accordance with claim 24, wherein at least one alignment pin is placed in the base body so as to engage said at least one spindle groove of the threaded spindle.

26. The linear motion unit in accordance with claim 2, wherein the at least one lubricating element has an active lubricating length of at least 25 mm.

* * * * *

UNITED STATES PATENT AND TRADEMARK OFFICE
CERTIFICATE OF CORRECTION

PATENT NO. : 6,595,327 B2
DATED : July 22, 2003
INVENTOR(S) : Keller, Bernhard

It is certified that error appears in the above-identified patent and that said Letters Patent is hereby corrected as shown below:

Column 1,
Line 34, "a" should be deleted

Column 2,
Line 61, "axially-extending" should read -- axially extending --

Column 8,
Line 67, "re" should read -- respect --

Column 9,
Line 17, "claims 3," should read -- claim 3, --

Column 10,
Line 38, "comprises" should read -- comprising --

Signed and Sealed this

Twenty-third Day of December, 2003

JAMES E. ROGAN
*Director of the United States Patent and Trademark Office*